United States Patent
Klemkowski, Jr.

[15] 3,662,485
[45] May 16, 1972

[54] FISH LURE

[72] Inventor: Philip J. Klemkowski, Jr., 1146 Hull Street, Baltimore, Md. 21230

[22] Filed: Nov. 12, 1969

[21] Appl. No.: 875,979

[52] U.S. Cl. ............................43/42.34, 43/42.39, 43/42.4, 43/42.45, 43/42.52
[51] Int. Cl. .........................................A01k 85/04
[58] Field of Search ...........43/42.34, 42.39, 42.4, 42.43, 43/42.45, 42.52, 43.2, 42.5

[56] References Cited

UNITED STATES PATENTS

| | | | |
|---|---|---|---|
| 2,895,252 | 7/1957 | Tibbetts | 43/43.2 X |
| 1,638,215 | 8/1927 | Rodgers | 43/42.39 |
| 2,074,258 | 3/1937 | Frauel | 43/42.4 |
| 2,165,734 | 7/1939 | Stracener | 43/42.39 X |
| 2,206,486 | 7/1940 | Nelson | 43/42.52 X |
| 2,319,026 | 5/1943 | Adam | 43/42.4 X |
| 2,703,947 | 3/1955 | Petrasek et al. | 43/42.39 |

FOREIGN PATENTS OR APPLICATIONS 179,012  8/1917  Canada..............................43/42.52

*Primary Examiner*—Samuel Koren
*Assistant Examiner*—George M. Yahwak

[57] ABSTRACT

A lure device for the various thermal layers of water to the moderate layers of water. The device is of such construction so as to wobble and lurch over the uneven bottom and is colored to resemble the normal food of the species being sought.

The device consists of a flat body having a rounded sinker portion attached thereto and is equipped with a double weed guard and a single fish hook.

1 Claim, 2 Drawing Figures

PATENTED MAY 16 1972 3,662,485

INVENTOR.
PHILIP J. KLEMKOWSKI, JR.

FISH LURE

This invention relates to a fish lure, and more particularly to a spoon type lure. It is therefore the purpose of this invention to provide a spoon type lure which will have a convex shaped sinker portion attached to one of the flat surfaces of the main body in order that the device will have movement when the fishing rod is moved slightly, the device being wobbled over the uneven bottom beneath the water the device is used in.

Another object of this invention is to provide a spoon which is of such construction so as to travel through the different depths of water and will be used to catch fresh or salt water fish. This device is colored to resemble the normal food of fish to be sought after, the device being colored flounder color for use in catching halibut, flounders, cod, haddock and cobia.

The best bait to be used on a hook for the above mentioned types being a thin strip from the white underbelly of a small flounder.

A further object of this invention is to provide a spoon which when used as a winter spoon, will be frog colored for use in fresh water lakes and rivers to catch bass, pike and pickerel, pork, rind being used on a hook for additional attraction to the fish.

For catching trout and salmon, the spoon will be colored chrome, brass or silver, the silver colored spoon having a feathered hook to resemble a cray fish, chub or hellgrammite. When the device is used to catch trout and salmon, it is pulled along the stream bed where most trout and salmon foods are found, living and hiding.

A still further object of this invention is to provide a spoon that will travel to the cool water where the large fish hide. Tests have pointed out that even though some fish rise to the surface for food, they nevertheless stay in the mean water temperature of 60° Fahrenheit, usually found on or close to the bottom of the water.

The inherent structure of the present invention causes it to stay in cool water regardless of the hot surface water temperatures, the water in any pool or large body of water is invariably cooler the deeper the angler fishes.

Other objects of the present invention are to provide a fish lure which is simple in design, inexpensive to manufacture, rugged in construction, easy to use and efficient in operation.

These and other objects will be readily evident upon a study of the following specification and the accompanying drawing wherein.

Figure 1:
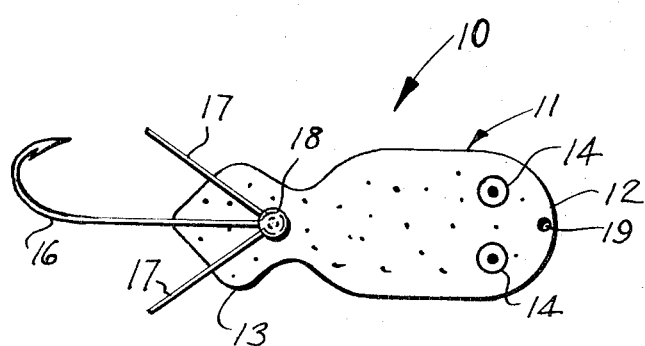
FIG. 1 is a top plan view of the present invention.

According to this invention, a winter spoon 10 is shown to include a main body portion 11 of flat metal or other suitable material. The main body portion 11 of spoon 10 is provided with a rounded head portion 12 and a spear shaped tail portion 13. Upon one side of the head portion 12 is fixedly secured a pair of spaced apart bead eyes 14. On the other side of main body 11 is fixedly secured a rounded sinker portion 15 which forms the belly of spoon 10.

It shall be noted that the sinker 15 being of such rounded configuration causes spoon 10 to have a muscle-like movement which is imparted to it by the slightest motion of the fishing rod.

Figure 2:
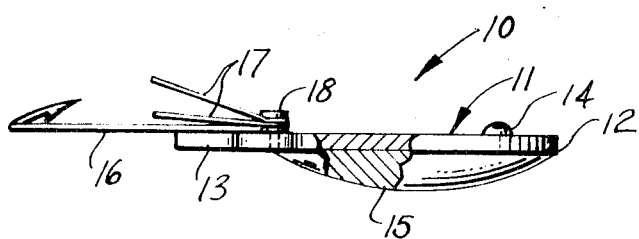
FIG. 2 is a side view of FIG. 1 shown in elevation and partly broken away.

A barbed hook 16 and a double weed guard 17 are secured to main body 11 of spoon 10 by means of a screw 18 secured within the tail portion 13 of spoon 10. As shown in FIG. 1 of the drawing, each guard member is sidewardly spread and equal distance from the shank of hook 16; and as shown in FIG. 2, both guards are bent upwardly at different angles, one being almost parallel to the hook shank whereas the other is at a greatly increased angle there to. The hook point is sidewardly bent as shown in FIG. 2 so that the point thereof is at an elevation between the ends of the two guard members.

An opening 19 through the head portion 12 of main body 11 provides for the attachment of a leader (not shown).

In use, spoon 10 when casted into the water will descend to the bottom after traveling through the various thermal layers of water above the cooler water at the bottom.

When pulled spoon 10 lurches and wobbles over the uneven bottom and is particularly snare-proof because of the weed guard wires and the round belly portion.

What I now claim is:

1. A winter spoon fish lure comprising an elongated and flat main body portion, a rounded sinker portion carried by said main body providing aquadynamic motion in order that said spoon will wobble and lurch in the cooler water near a bottom of a body of water, a barbed hook and a double weed guard wire carried by said main body with fastening means for securing said hook and weed guard wire to said main body of said spoon, said main body being provided with a rounded head and a spear-shaped tail, said main body being flat and having secured to one side said rounded sinker which forms a belly of said spoon, said belly in conjunction with said flat main body causing a wobble and lurching motion over the uneven bottom beneath a body of water, and said sinker allowing said spoon to descend through the various thermal layers of water to the cooler water at the bottom in order to catch the larger fish that dwell in the cooler body of water, said head being provided with a pair of spaced apart bead eyes, said eyes in conjunction with the over all structure serving to impart a live bait look to said device in order to attract fish, said hook extending past said tail of said main body and lying in a generally horizontal plane and with the hook point bent upwardly to lie between the guard wire extremities, said weed guard wires being angularly spaced apart sidewardly and extending additionally angularly upwardly, one of said guards being at a greater angle upwardly than the other said guard so to protect said hook from being snagged on a bottom of said body of water, and said fastening means comprising a screw secured to said weed guard wires and said hook providing a means of maintaining said weed guard wires and said hook stationary to the flat surface of said tail of said main body.

* * * * *